United States Patent
Kwon et al.

(10) Patent No.: US 9,929,439 B2
(45) Date of Patent: Mar. 27, 2018

(54) STEPPED ELECTRODE ASSEMBLY INCLUDING STEPPED UNIT CELL

(71) Applicant: LG CHEM, LTD., Seoul (KR)

(72) Inventors: Sung-Jin Kwon, Daejeon (KR); Dong-Myung Kim, Daejeon (KR); Ki-Woong Kim, Daejeon (KR); Soon-Ho Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/366,271

(22) Filed: Dec. 1, 2016

(65) Prior Publication Data

US 2017/0084957 A1 Mar. 23, 2017

Related U.S. Application Data (63) Continuation of application No. 14/361,517, filed as application No. PCT/KR2014/001004 on Feb. 6, 2014.

(30) Foreign Application Priority Data

Feb. 8, 2013 (KR) .......................... 10-2013-0014717

(51) Int. Cl.
*H01M 10/0585* (2010.01)
*H01M 2/16* (2006.01)
(Continued)

(52) U.S. Cl.
CPC ..... *H01M 10/0585* (2013.01); *H01M 2/1673* (2013.01); *H01M 10/02* (2013.01);
(Continued)

(58) Field of Classification Search
CPC ............................................... H01M 10/0585
See application file for complete search history.

(56) References Cited

U.S. PATENT DOCUMENTS

| | | | |
|---|---|---|---|
| 6,224,995 B1 * | 5/2001 | Fauteux | H01M 4/0442 29/623.1 |
| 6,689,511 B2 | 2/2004 | Yamada et al. | |

(Continued)

FOREIGN PATENT DOCUMENTS

| | | |
|---|---|---|
| EP | 2 750 239 A1 | 7/2014 |
| EP | 2 750 241 A1 | 7/2014 |

(Continued)

OTHER PUBLICATIONS

Extended European Search Report, dated Jul. 6, 2015, for European Application No. 14725951.9.

(Continued)

*Primary Examiner* — Jeremiah R Smith
(74) *Attorney, Agent, or Firm* — Birch, Stewart, Kolasch & Birch, LLP (57) ABSTRACT

There is provided a stepped electrode assembly including: a first electrode stack including at least one first unit cell, the first unit cell including at least one positive electrode and at least one negative electrode having the same area and being alternately stacked in a vertical direction with a separator disposed therebetween; and a second unit cell including at least one positive electrode and at least one negative electrode that are alternately stacked in the vertical direction with a separator disposed therebetween, the second unit cell disposed on a side of the first electrode stack with a separator disposed therebetween, wherein the second unit cell includes a first area electrode having the same area as an electrode area of the first electrode stack and a second area electrode having an area different from the area of the first area electrode, wherein the second unit cell is a stepped unit cell including a stepped portion formed by an area difference between the first and second area electrodes.

10 Claims, 5 Drawing Sheets

(51) Int. Cl.
  *H01M 10/0525* (2010.01)
  *H01M 10/04* (2006.01)
  *H01M 10/052* (2010.01)
  *H01M 10/02* (2006.01)
  *H01M 10/0583* (2010.01)

(52) U.S. Cl.
  CPC ....... *H01M 10/04* (2013.01); *H01M 10/0413* (2013.01); *H01M 10/0436* (2013.01); *H01M 10/052* (2013.01); *H01M 10/0525* (2013.01); *H01M 10/0583* (2013.01); *Y02T 10/7011* (2013.01)

(56) References Cited

U.S. PATENT DOCUMENTS

| | | | |
|---|---|---|---|
| 7,273,674 | B1* | 9/2007 | Frustaci .............. H01M 4/13 29/623.1 |
| 2001/0005561 | A1 | 6/2001 | Yamada et al. |
| 2002/0122975 | A1 | 9/2002 | Spillman et al. |
| 2003/0013012 | A1 | 1/2003 | Ahn et al. |
| 2011/0183183 | A1 | 7/2011 | Grady et al. |
| 2012/0015236 | A1 | 1/2012 | Spare |
| 2013/0171493 | A1 | 7/2013 | Wayne et al. |

FOREIGN PATENT DOCUMENTS

| | | |
|---|---|---|
| EP | 2 802 034 A1 | 11/2014 |
| JP | 2001-23615 A | 1/2001 |
| JP | 2001-167743 A | 6/2001 |
| JP | 2003-523060 A | 7/2003 |
| JP | 3611765 B2 | 1/2005 |
| JP | 2010-62081 A | 3/2010 |
| JP | 2010-97730 A | 4/2010 |
| JP | 2013-30362 A | 2/2013 |
| KR | 10-2008-0099890 A | 11/2008 |
| KR | 10-2009-0008075 A | 1/2009 |
| WO | WO 2011/094286 A2 | 8/2011 |
| WO | WO 2011/126310 A2 | 10/2011 |
| WO | WO 2012/009423 A1 | 1/2012 |

OTHER PUBLICATIONS

European Office Action for Appl. No. 14725951.9 dated Apr. 6, 2016.

* cited by examiner

STEPPED ELECTRODE ASSEMBLY INCLUDING STEPPED UNIT CELL

CROSS-REFERENCE TO RELATED APPLICATIONS

This application is a Continuation of copending U.S. application Ser. No. 14/361,517, filed on May 29, 2014, which is a National Stage of International Application No. PCT/KR2014/001004, filed on Feb. 6, 2014, which claims priority under 35 U.S.C. § 119(a) to Application No. 10-2013-0014717, filed in the Republic of Korea on Feb. 8, 2013, all of which are hereby expressly incorporated by reference into the present application.

TECHNICAL FIELD

The present disclosure relates to an electrode assembly having a stepped portion, and more particularly, to an electrode assembly having an increased degree of structural freedom in a thickness direction thereof.

BACKGROUND ART

In the related art, an electrode assembly is assembled by stacking a plurality of C-type or A-type bi-cells, each of the C-type or A-type bi-cells including electrodes having the same polarity and an electrode having a different polarity and disposed between the electrodes of the same polarity.

Figure 1:
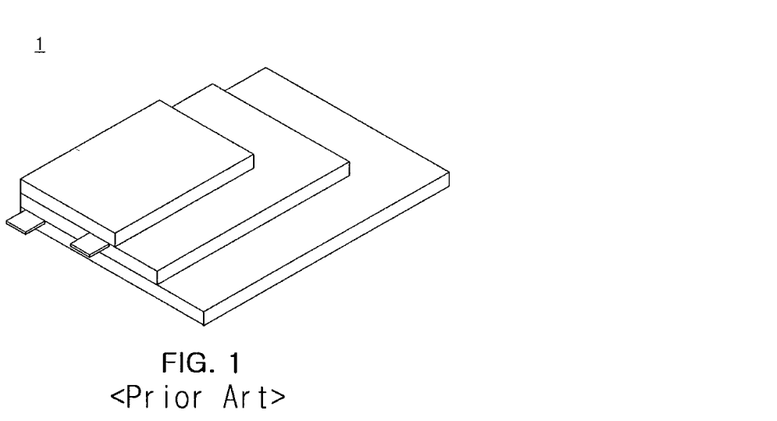
FIG. 1 is a perspective view illustrating an electrode assembly having stepped portions.
Figure 2A:
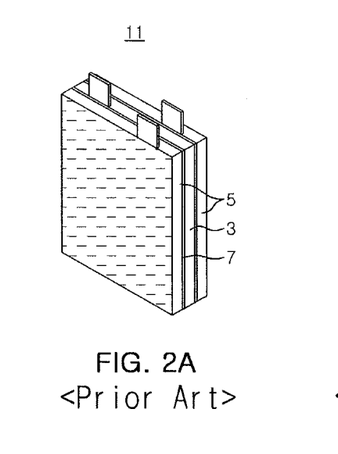
FIGS. 2A and 2B are schematic perspective views illustrating general bi-cells used to form an electrode assembly, FIG. 2A illustrating a C-type bi-cell, FIG. 2B illustrating an A-type bi-cell.
Figure 2B:
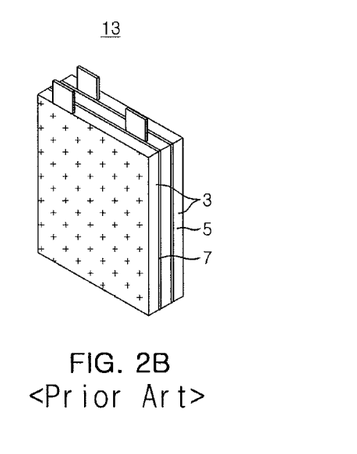

Referring to FIG. 1, an electrode assembly 1 having stepped portions may be assembled as follows: a first electrode stack is formed by stacking a plurality of bi-cells having the same area such as an A-type bi-cell 13 and a C-type bi-cell 11 shown in FIG. 2; and a second electrode stack in which bi-cells having equal areas smaller than the area of each electrode of the first electrode stack is disposed on the first electrode stack. In this manner, a stepped electrode assembly having an area decreasing in a vertical direction, such as the electrode assembly 1 shown in FIG. 1, may be assembled.

DISCLOSURE

Technical Problem

New types of devices having various designs require batteries having new designs. Therefore, there is increasing demand for batteries having various designs.

Therefore, an aspect of the present disclosure may provide an electrode assembly having an improved degree of structural freedom in the thickness direction thereof as compared with electrode assemblies assembled using bi-cells of the related art.

Technical Solution

According to an aspect of the present disclosure, a stepped electrode assembly has an improved degree of structural freedom in the thickness direction thereof. The stepped electrode assembly may include: a first electrode stack including at least one first unit cell, the first unit cell including at least one positive electrode and at least one negative electrode having the same area and being alternately stacked in a vertical direction with a separator disposed therebetween; and a second unit cell including at least one positive electrode and at least one negative electrode that are alternately stacked in the vertical direction with a separator disposed therebetween, the second unit cell disposed on a side of the first electrode stack with a separator disposed therebetween, wherein the second unit cell include a first area electrode having the same area as an electrode area of the first electrode stack and a second area electrode having an area different from the area of the first area electrode, wherein the second unit cell is a stepped unit cell including a stepped portion formed by an area difference between the first and second area electrodes.

The first and second area electrodes of the stepped unit cell may face each other, and one of the first and second area electrodes having a comparatively large area may be a negative electrode.

The stepped unit cell may be an A-type bi-cell including positive electrodes on both sides thereof and a negative electrode disposed therebetween, or a C-type bi-cell including negative electrodes on both sides thereof and a positive electrode disposed therebetween. In addition, the stepped unit cell may be a stacked type unit cell or a stacked and folded type unit cell.

A second electrode stack including electrodes having the same area as the area of the second area electrode of the stepped unit cell may be disposed on the second area electrode of the stepped unit cell with a separator disposed therebetween, and the second area electrode and an electrode of the second electrode stack facing the second area electrode may have different polarities.

A second electrode stack including electrodes having equal areas different from the area of the second area electrode of the stepped unit cell may be disposed on the second area electrode of the stepped unit cell with a separator disposed therebetween, and the second area electrode and an electrode of the second electrode stack facing the second area electrode may have different polarities. In this case, a larger of the second area electrode and the electrode of the second electrode stack facing the second area electrode may be a negative electrode.

A second stepped unit cell may be disposed on the second area electrode of the stepped unit cell with a separator disposed therebetween, and an electrode of the second stepped unit cell facing the second area electrode of the stepped unit cell may have the same area as the second area electrode but a polarity different from that of the second area electrode. In this case, a comparatively large electrode of the second stepped unit cell may be a negative electrode.

A second stepped unit cell may be disposed on the second area electrode of the stepped unit cell with a separator disposed therebetween, and an electrode of the second stepped unit cell facing the second area electrode of the stepped unit cell may have an area and polarity different from those of the second area electrode. In this case, a larger of the second area electrode and the electrode of the second unit cell facing the second area electrode may be a negative electrode, and a comparatively large electrode of the second stepped unit cell may be a negative electrode.

The electrode assembly may be a stacked type electrode assembly or a stacked and folded type electrode assembly. In addition, each of outermost electrodes disposed on both sides of the electrode assembly may be independently a negative electrode or a positive electrode. In this case, at least one of the outermost electrodes may be a one-side-coated electrode.

According to another aspect of the present disclosure, a secondary battery may include the electrode assembly. The electrode assembly may be disposed in a battery case. In this case, the battery case may be a pouch type case. In addition, the secondary battery may be a lithium ion secondary battery or a lithium ion polymer secondary battery.

According to another aspect of the present disclosure, a battery pack may include at least two secondary batteries such as the above-described secondary battery.

According to another aspect of the present disclosure, a device may include one or more secondary batteries such as the above-described secondary battery. The device may be a cellular phone, a portable computer, a smartphone, a smartpad, a net book, an LEV (light electronic vehicle), an electric vehicle, a hybrid electric vehicle, a plug-in hybrid electric vehicle, or a power storage device.

Advantageous Effects

According to the present disclosure, since the stepped electrode assembly is assembled using stepped bi-cells having stepped portions, the degree of structural freedom of the electrode assembly may be improved in the thickness direction thereof.

Particularly, the degree of structural freedom of the electrode assembly may be markedly improved because it is not required to use an even number of bi-cells for disposing negative electrodes as a comparatively large electrode and outermost electrodes when assembling the electrode assembly.

In addition, since the degree of structural freedom of the electrode assembly can be improved by using fewer mono-cells or without using mono-cells, process errors caused by mono-cells bent when the mono-cells are gripped in a feeding process of unit cells may be prevented.

BEST MODE

Generally, an electrode assembly having a stepped portion is assembled by stacking a plurality of C-type or A-type bi-cells, each of the C-type or A-type bi-cell including electrodes of the same polarity and an electrode having a different polarity and disposed between the electrodes of the same polarity.

Figure 3:
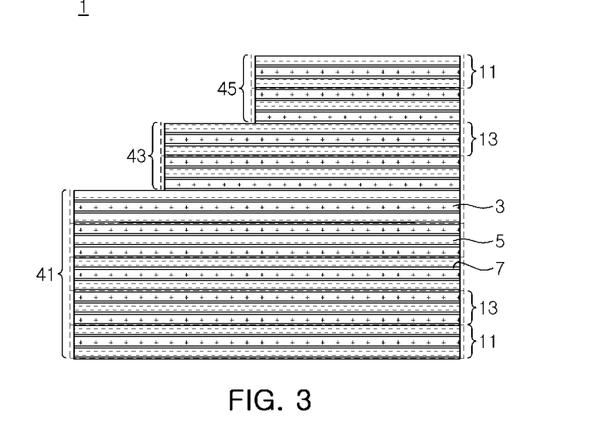
FIG. 3 is a schematic cross-sectional view illustrating an electrode assembly assembled using bi-cells such as shown in FIGS. 2A and 2B.

For example, an electrode assembly 1 having stepped portions may be formed by assembling a first electrode stack 41 having a large size, a second electrode stack 43 having a medium size, and a third electrode stack 45 having a small size in such a manner that the first and second electrode stacks 41 and 43 face each other and the second and third electrode stacks 43 and 45 face each other as shown in FIG. 3. At interfaces of the first, second, and third electrode stacks 41, 43, and 45 at which stepped portions are formed, the larger electrode stacks 41 and 43 include negative electrodes 5 as interfacial electrodes, and the smaller electrode stacks 43 and 45 include positive electrodes 3 as interfacial electrodes. Therefore, electrodes having different polarities face each other at the interfaces of the first, second, and third electrode stacks 41, 43, and 45.

In this case, as shown in FIG. 3, each of two or more electrode stacks (the second and third electrode stacks 43 and 45) to be disposed on the lowermost first electrode stack 41 may have an even number of bi-cells 11 and 13 (2×n where n is an integer equal to or greater than 1). Therefore, there is a limitation when two or more electrode stacks (43 and 45) to be disposed on the lowermost first electrode stack 41 cannot be constituted by even numbers of bi-cells 11 and 13 due to the shape of a device in which the electrode assembly 1 will be used.

The inventors have repeatedly conducted research to develop electrode assemblies having an improved degree of design freedom in the thickness direction thereof. As a result, the inventors found that if an electrode assembly is formed by assembling bi-cells having stepped portions, the thickness of the electrode assembly can be easily adjusted in a vertical direction. That is, the degree of structural freedom of the electrode assembly can be improved in the thickness direction thereof according to requirements of a device in which the electrode assembly will be used. The inventors have invented the present invention based on this knowledge.

The present disclosure provides an electrode assembly including at least one unit cell in which at least one positive electrode and at least negative electrode are vertically stacked with a separator disposed therebetween. For example, as shown in FIG. 1, the present disclosure provides an electrode assembly having stopped portions and improved in the degree of freedom in the thickness direction thereof.

In the present disclosure, the electrode assembly having a stepped portion may be formed by stacking unit cells. That is, the electrode assembly may be formed by stacking unit cells each including at least one negative electrode, at least one positive electrode, and a separator disposed between the negative and positive electrodes.

Figure 4:
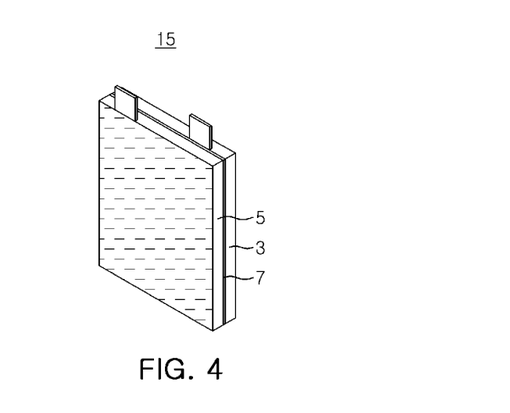
FIG. 4 is a schematic perspective view illustrating a mono-cell used to form an electrode assembly.

In the present disclosure, the unit cells are not limited to a particular type. As shown in FIGS. 2A and 2B, examples of the unit cells may include: an A-type bi-cell 13 including positive electrodes 3 on both sides thereof and a negative electrode 5 disposed therebetween; and a C-type bi-cell 11 including negative electrodes 5 on both sides thereof and a positive electrodes 3 disposed therebetween. In addition, as shown in FIG. 4, examples of the unit cells may include a mono-cell 15 including a negative electrode 5, a positive electrode 3, and a separator 7 disposed therebetween.

Figure 9A:
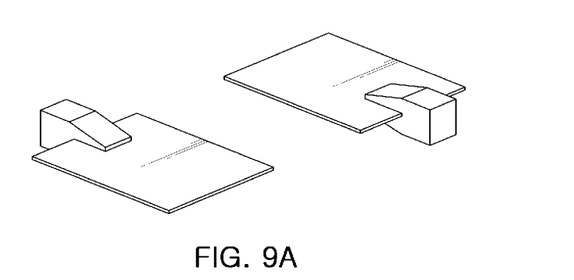
FIGS. 9A and 9B are schematic views illustrating bending of bi-cells and mono-cells when the bi-cells and the mono-cells are gripped in a feeding process, FIG. 9A illustrating bending of the bi-cells, FIG. 9B illustrating bending of the mono-cells.
Figure 9B:
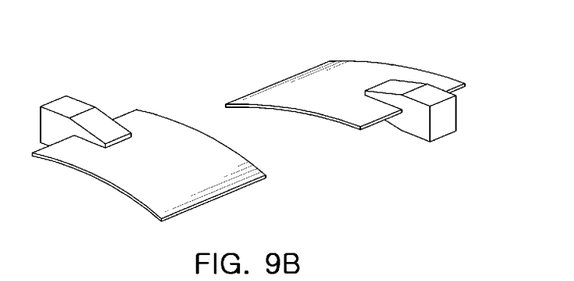

Bi-cells may be used as unit cells to reduce errors in a unit cell stacking process. That is, bi-cells each including three electrodes and two separators have a higher degree of stiffness than mono-cells each including a negative electrode, a positive electrode, with a separator disposed therebetween. As shown in FIGS. 9A and 9B, if mono-cells are used as unit cells to form an electrode assembly, the unit cells may be bent to cause process errors in a feeding process in which the unit cells are gripped and fed for stacking or arrangement. That is, if bi-cells having a high degree of stiffness are used as unit cells instead of mono-cells, process errors may be decreased.

In the present disclosure, the electrode assembly is formed using the above-described unit cells. In the electrode assembly, positive and negative electrodes are alternately stacked in a vertical direction with separators disposed therebetween, and one or more stepped portions are formed on the electrode assembly. Such a stepped portion may be formed on two layers of at least two kinds of electrodes having different areas. For example, one or two stepped portions may be formed on two or three layers by disposing a stepped unit cell on a first electrode stack, wherein the stepped unit cell includes at least one first area electrode having a first area and at least one second area electrode disposed on the first area electrode and having a second area different from the first area.

Figure 6A:
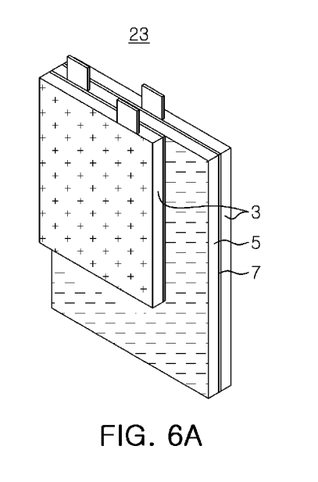
FIGS. 6A and 6B are schematic perspective views illustrating stepped bi-cells used to form an electrode assembly according to the present disclosure, FIG. 6A illustrating an A-type bi-cell, FIG. 6B illustrating a C-type bi-cell.
Figure 6B:
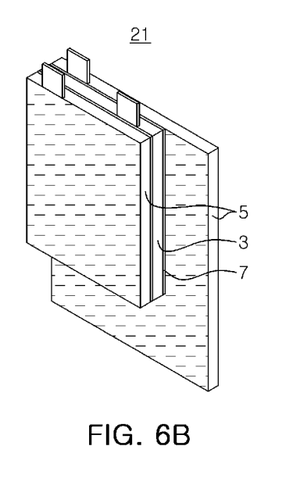
Figure 7A:
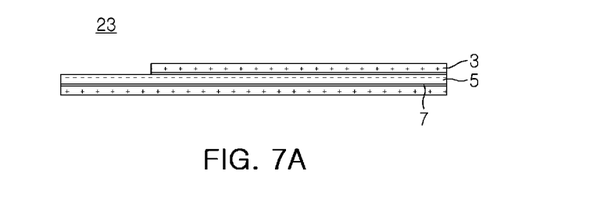
FIGS. 7A and 7B are schematic cross-sectional views illustrating stepped bi-cells used to form an electrode assembly according to the present disclosure, FIG. 7A illustrating an A-type bi-cell, FIG. 7B illustrating a C-type bi-cell.
Figure 7B:
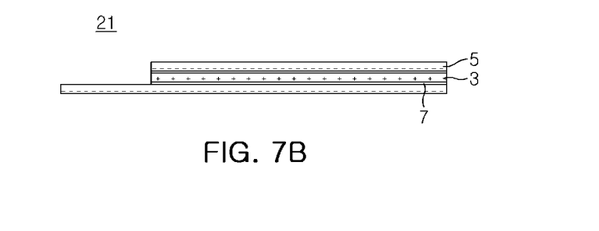

In the present disclosure, the stepped unit cell may be a stepped bi-cell, and examples of the stepped bi-cell are shown in FIGS. 6A to 7B. FIGS. 6A and 6B are perspective views illustrating stepped bi-cells 21 and 23, and FIGS. 7A and 7B are cross-sectional views illustrating the stepped bi-cells 21 and 23. The stepped bi-cell 23 illustrated in FIGS. 7A and 7B is an A-type stepped bi-cell including positive electrodes 3 on both sides thereof and a negative electrode 5 disposed therebetween, and the stepped bi-cell 21 illustrated in FIGS. 6B and 7B is a C-type stepped bi-cell including negative electrodes 5 on both sides thereof and a positive electrode 3 disposed therebetween.

In each of the stepped bi-cells 21 and 23 shown in FIGS. 6A to 7B, a stepped portion is formed by disposing a comparatively small positive electrode 3 on a comparatively large negative electrode 5. That is, the larger of two interfacial electrodes at which a stepped portion is formed may be a negative electrode. As described above, if a negative electrode is the larger of two interfacial electrodes, lithium may not precipitate from a positive electrode active material during charging and discharging operations of a battery, and thus the stability of the battery may not be deteriorated by the precipitation of lithium.

In the present disclosure, the stepped unit cell may be a stepped bi-cell as described above. Alternatively, the stepped unit cell may be a stepped mono-cell. However, as described above, a stepped bi-cell may be favored as the stepped unit cell if errors in a feeding process are considered.

Figure 5:
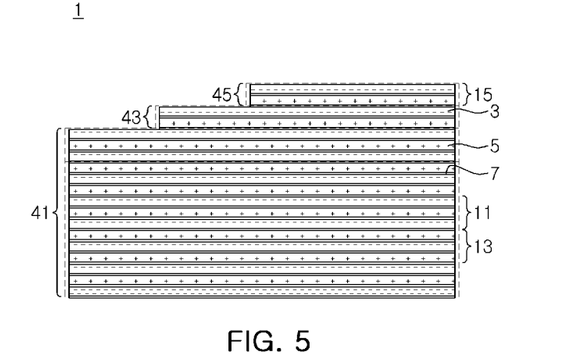
FIG. 5 is a schematic cross-sectional view illustrating a comparative example of an electrode assembly having an improved degree of structural freedom in the thickness direction thereof, the electrode assembly being assembled using bi-cells and mono-cells such as shown in FIGS. 2A and 2B and FIG. 4.
Figure 8:
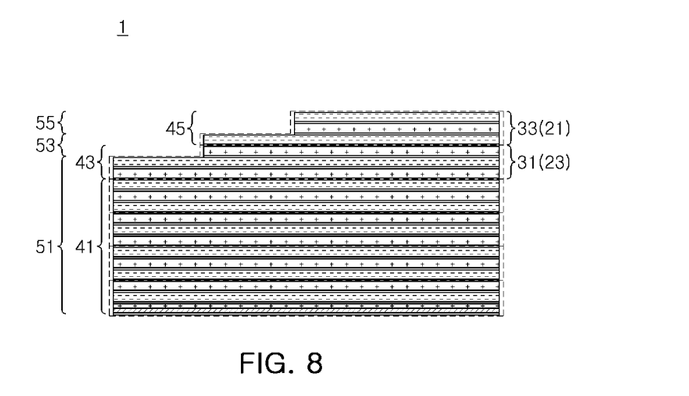
FIG. 8 is a schematic cross-sectional view illustrating an electrode assembly assembled using stepped bi-cells according to the present disclosure.

Conventional mono-cells not having stepped portions such as the mono-cell 15 shown in FIG. 4 may be used to form an electrode assembly 1 shown in FIG. 5. The electrode assembly 1 shown in FIG. 5 may have an improved degree of structural freedom as compared with the electrode assembly 1 of FIG. 3 assembled by using the A-type and C-type bi-cells 13 and 11. However, according to an embodiment of the present disclosure, stepped bi-cells 31 and 33 such as the stepped bi-cells 21 and 23 shown in FIGS. 6A to 7B may be used to form an electrode assembly 1 shown in FIG. 8. Referring to FIGS. 5 and 8, the electrode assembly 1 formed of the stepped bi-cells 31 and 33 according to the embodiment of the present disclosure has a small number of electrodes stacked in the thickness direction thereof as compared of the electrode assembly 1 formed of mono-cells. That is, the electrode assembly 1 of the embodiment of the present disclosure may have an improved degree of structural freedom.

In the present disclosure, a stepped unit cell including a first area electrode having a comparatively large area and a second area electrode having a comparatively small area may be disposed on a first electrode stack in such a manner that the first or second area electrode faces the first electrode stack, and the first or second area electrode may have the same area as the area of an electrode of the first electrode stack facing the first or second area electrode. Alternatively, the first area electrode may be disposed to face an electrode stack constituted by electrodes having an area larger than the area of the first area electrode so as to form a stepped portion, and the second area electrode may be disposed to face an electrode stack constituted by electrodes having an area smaller than the area of the second area electrode so as to form a stepped portion.

For example, a first stepped bi-cell may include positive and negative electrodes having a comparatively large area and a positive electrode having a comparatively small area, and the positive and negative electrodes having a comparatively large area may be disposed to face a first electrode stack having the same area as the positive and negative electrodes. In this way, two layers having areas decreasing in the height (vertical) direction thereof may be formed, and a single stepped portion may be formed on the two layers.

Alternatively, the positive electrode of the first stepped bi-cell having a comparatively small area may be disposed on a second electrode stack having the same area of the positive electrode or may be disposed on a relatively large electrode of a second stepped bi-cell having the same area as the positive electrode may face. In this way, two layers having areas increasing in the height (vertical) direction thereof may be formed as an electrode assembly having a single stepped portion.

For example, a comparatively large electrode of a stepped unit cell may be disposed to face a first electrode stack, and the comparatively large electrode may have an area smaller or larger than the electrode area of the first electrode stack. For example, an electrode of the stepped unit cell having an area smaller than the electrode area of the first electrode stack may be a comparatively large electrode of the stepped unit cell and may face the first electrode stack. Alternatively, an electrode stack having an area smaller than the area of a comparatively small electrode of the stepped unit cell may be disposed on the comparatively small electrode of the stepped unit cell. In this way, stepped portions may be formed between the first electrode stack and the stepped unit cell. That is, three layers having areas increasing or decreasing in the height (vertical) direction thereof may be formed as an electrode assembly having two stepped portions.

As described above, a comparatively large electrode of the stepped unit cell located on an interface of the stepped unit cell forming a stepped portion may be a negative electrode. In addition, a comparatively large electrode disposed on an interface between the first electrode stack and the stepped unit cell may be a negative electrode.

The first electrode stack and the stepped unit may be stacked in such a manner that mutually-facing electrodes of the first electrode stack and the stepped unit may have different polarities. If negative and positive electrodes are alternately arranged in an electrode assembly as described above, a battery reaction may occur throughout the electrode assembly, and thus the capacity of the electrode assembly (battery) may be increased.

According to an embodiment of the present disclosure, a first stepped unit cell including a first area electrode having a comparatively large area and a second area electrode having a comparatively small area may be disposed on a first electrode stack, and a second electrode stack including electrodes having the same area may be disposed on the second area electrode of the first stepped unit with a separator disposed therebetween so as to form an electrode assembly. At this time, mutually-facing electrodes of the first stepped unit cell and the second electrode stack may have different polarities, and the area of each of the electrodes of the second electrode stack may be equal to or different from the area of the second area electrode. If the area of each of the electrodes of the second electrode stack is different from the area of the second area electrode of the first stepped unit cell, a stepped portion is formed at an interface between the first stepped unit cell and the second electrode stack, and the larger of the electrodes mutually facing each other at the interface may be a negative electrode.

Then, the electrode assembly may have a first layer formed by the first electrode stack and the first area electrode (having a comparatively large area) of the first stepped unit cell (stepped bi-cell), and a second layer formed by the second area electrode (having a comparatively small area) of the first stepped unit cell and the second electrode stack. Alternatively, the electrode assembly may have a first layer formed by the first electrode stack and the first area electrode of the first stepped unit cell, a second layer formed by the second area electrode of the first stepped unit cell, and a third layer formed by the electrodes of the second electrode stack smaller than the second area electrode.

Alternatively, in the electrode assembly of the embodiment of the present disclosure, a second stepped unit cell may be disposed on the second area electrode of the first stepped unit cell with a separator disposed therebetween. In this case, a comparatively large electrode of the second stepped unit cell may be a negative electrode, and mutually-facing electrodes of the first stepped unit cell and the second stepped unit cell may have different polarities. In addition, the area of an electrode of the second stepped unit cell facing the second area electrode of the first stepped unit cell may be equal to or different from the area of the second area electrode. For example, a stepped portion may be formed at an interface between the first stepped unit cell and the second stepped unit cell because the area of the second area electrode of the first stepped unit cell is different from the area of a first area electrode of the second stepped unit cell. In this case, the larger of the electrodes facing each other at the interface between the first and second stepped unit cells may also be a negative electrode.

Then, the electrode assembly may have a first layer formed by the first electrode stack and the first area electrode of the first stepped unit cell, a second layer formed by the second area electrode of the first stepped unit cell and the first area electrode of the second stepped unit cell, and a third layer formed by the second area electrode of the second stepped unit cell. Alternatively, the electrode assembly may have a first layer formed by the first electrode stack and the first area electrode of the first stepped unit cell, a second layer formed by the second area electrode of the first stepped unit cell, a third layer formed by the first area electrode of the second stepped unit cell, and a fourth layer formed by the second area electrode of the second stepped unit cell.

An exemplary electrode assembly 1 is schematically shown in FIG. 8 according to an embodiment of the present disclosure. Referring to FIG. 8, the electrode assembly 1 is formed by disposing a first stepped unit cell 31 on a first electrode stack 41, and disposing a second stepped unit cell 33 on the first stepped unit cell 31. The electrode assembly 1 has a width decreasing in the height direction thereof, and two stepped portions are formed on the electrode assembly 1. The first electrode stack 41 includes negative and positive electrodes 5 and 3 that are alternately stacked with separators 7 disposed therebetween.

The first stepped unit cell 31 and the second stepped unit cell 33 are an A-type bi-cell 23 and a C-type bi-cell 21, respectively. In the first and second stepped unit cells 31 and 33, negative and positive electrodes are alternately stacked. In addition, the larger of mutually-facing electrodes of the first and second stepped unit cells 31 and 33 is a negative electrode, and the smaller of the mutually-facing electrodes is a positive electrode.

The scope and spirit of the present disclosure are not limited to the above-described electrode assemblies. That is, first electrode stacks, stepped unit cells, second electrode stacks, and second unit cells may be variously combined to form various electrode assemblies.

In the present disclosure, non-limiting examples of unit cells used to form electrode assemblies include stacked type unit cells, stacked and folded type unit cells (winding type or Z-folded type), and combinations thereof. Furthermore, in the present disclosure, electrode assemblies may be formed by stacking stacked type unit cells or stacked and folded type unit cells, or may be formed by stacking stacked type unit cells, and stacked and folded type unit cells. That is, unit cells of electrode assemblies are not limited to a particular type.

In the present disclosure, the outermost electrodes of an electrode assembly may be negative electrodes or positive electrodes, or may be a negative electrode and a positive electrode, respectively. In addition, the outermost electrodes of an electrode assembly may be one-side-coated electrodes. The term "one-side-coated electrode" refers to an electrode in which only one side of a collector is coated with an electrode active material and the other side is not coated. In this case, sides of the outermost electrodes coated with an electrode active material may face with electrodes having a different polarity to contribute to charging and discharging reactions of a battery, and the other sides (non-coated portion) of the outermost electrodes not coated with the electrode active material may face the outside of the electrode assembly.

Particularly, if a positive electrode is an outermost electrode of an electrode assembly, the positive electrode may be a one-side-coated electrode. Then, precipitation of lithium may be prevented during battery reactions, and thus the stability of a battery may be improved. In addition, if a negative electrode is an outermost electrode of an electrode assembly, the negative electrode may also be a one-side-coated electrode. In this case, the consumption of an electrode active material may be reduced to save costs, and the thickness of the electrode assembly may be reduced by the thickness of an electrode active material layer, thereby improving the degree of structural freedom of the electrode assembly in the thickness direction of the electrode assembly.

Lithium ion secondary batteries or lithium ion polymer secondary batteries may be manufactured using electrode assemblies of the embodiments of the present disclosure. In this case, an electrode assembly may be disposed in a battery case, and the battery case may be a pouch or prism type battery case.

In addition, a battery pack including at least two battery cells each including an electrode assembly of the present disclosure may be manufactured, and a device may include one or more of such battery cells. Examples of the device may be a cellular phone, a portable computer, a smartphone, a smartpad, a net book, a light electronic vehicle (LEV), an electric vehicle, a hybrid electric vehicle, a plug-in hybrid electric vehicle, and a power storage device.

What is claimed is:

1. A method of manufacturing a stepped electrode assembly comprising:
    first, stacking a first electrode stack comprising at least one first unit cell, the first unit cell comprising at least one positive electrode and at least one negative electrode having the same area and being alternately stacked in a vertical direction with a separator disposed therebetween; and
    subsequently, stacking a preformed, second unit cell on a side of the first electrode stack with a separator disposed therebetween, the second unit cell comprising at least one positive electrode and at least one negative electrode that are alternately stacked in the vertical direction with a separator disposed therebetween,
    wherein the second unit cell comprises a first area electrode having the same area as an electrode area of the first electrode stack and a second area electrode having an area different from the area of the first area electrode,
    wherein the second unit cell is a stepped unit cell comprising a stepped portion formed by an area difference between the first and second area electrodes,
    wherein the stepped unit cell stacked on a side of the first electrode stack with a separator disposed therebetween, is an A-type bi-cell comprising positive electrodes on both sides thereof and a negative electrode disposed therebetween, or a C-type bi-cell comprising negative electrodes on both sides thereof and a positive electrode disposed therebetween,
    wherein a larger of two interfacial electrodes of the stepped unit cell at which a stepped portion is formed is a negative electrode, and
    wherein the stepped unit cell is a Z-folded type unit cell.

2. The method of manufacturing the electrode assembly of claim 1, wherein a second electrode stack comprising electrodes having the same area as the area of the second area electrode of the stepped unit cell is disposed on the second area electrode of the stepped unit cell with a separator disposed therebetween, and the second area electrode and an electrode of the second electrode stack facing the second area electrode have different polarities.

3. The method of manufacturing the electrode assembly of claim 1, wherein a second electrode stack comprising electrodes having equal areas different from the area of the second area electrode of the stepped unit cell is disposed on the second area electrode of the stepped unit cell with a separator disposed therebetween, and the second area electrode and an electrode of the second electrode stack facing the second area electrode have different polarities.

4. The method of manufacturing the electrode assembly of claim 3, wherein a larger of the second area electrode and the electrode of the second electrode stack facing the second area electrode is a negative electrode.

5. The method of manufacturing the electrode assembly of claim 1, wherein a second stepped unit cell is disposed on the second area electrode of the stepped unit cell with a separator disposed therebetween, and an electrode of the second stepped unit cell facing the second area electrode of the stepped unit cell has the same area as the second area electrode but a polarity different from that of the second area electrode.

6. The method of manufacturing the electrode assembly of claim 5, wherein a comparatively large electrode of the second stepped unit cell is a negative electrode.

7. The method of manufacturing the electrode assembly of claim 1, wherein a second stepped unit cell is disposed on the second area electrode of the stepped unit cell with a separator disposed therebetween, and an electrode of the second stepped unit cell facing the second area electrode of the stepped unit cell has an area and polarity different from those of the second area electrode.

8. The method of manufacturing the electrode assembly of claim 7, wherein a larger of the second area electrode and the electrode of the second unit cell facing the second area electrode is a negative electrode, and a comparatively large electrode of the second stepped unit cell is a negative electrode.

9. The method of manufacturing the electrode assembly of claim 1, wherein each of outermost electrodes disposed on both sides of the electrode assembly is independently a negative electrode or a positive electrode.

10. The method of manufacturing the electrode assembly of claim 9, wherein at least one of the outermost electrodes is a one-side-coated electrode.

* * * * *